United States Patent
Grönthal et al.

(10) Patent No.: US 7,965,067 B2
(45) Date of Patent: Jun. 21, 2011

(54) DYNAMIC COMPENSATION FOR A PRE-REGULATED CHARGE PUMP

(75) Inventors: Janne Antti Grönthal, Klaukkala (FI);
Jarkko Antero Routama, Espoo (FI);
Kimmo Kristian Hauskaviita, Veikkola (FI); Jonne Jalmar Sebastian Lindeberg, Helsinki (FI)

(73) Assignee: Texas Instruments Incorporated, Dallas, TX (US)

( * ) Notice: Subject to any disclaimer, the term of this patent is extended or adjusted under 35 U.S.C. 154(b) by 133 days.

(21) Appl. No.: 12/262,687

(22) Filed: Oct. 31, 2008

(65) Prior Publication Data

US 2010/0110736 A1 May 6, 2010

(51) Int. Cl.
G05F 1/00 (2006.01)
H02M 3/18 (2006.01)
(52) U.S. Cl. ........ 323/280; 323/274; 323/275; 323/276; 323/282
(58) Field of Classification Search .......... 323/266–268, 323/271, 273–280, 282; 363/59, 60
See application file for complete search history.

(56) References Cited

U.S. PATENT DOCUMENTS

| | | | | | |
|---|---|---|---|---|---|
| 5,296,760 | A | * | 3/1994 | Oertle et al. .................. | 326/62 |
| 6,157,180 | A | * | 12/2000 | Kuo .............................. | 323/282 |
| 6,333,623 | B1 | * | 12/2001 | Heisley et al. ................ | 323/280 |
| 6,590,439 | B1 | * | 7/2003 | Larson .......................... | 327/363 |
| 6,600,299 | B2 | * | 7/2003 | Xi .................................. | 323/280 |
| 7,710,091 | B2 | * | 5/2010 | Huang .......................... | 323/280 |
| 2003/0034822 | A1 | * | 2/2003 | Becker ......................... | 327/309 |
| 2003/0218450 | A1 | * | 11/2003 | Bonte ........................... | 323/273 |
| 2007/0241730 | A1 | * | 10/2007 | Dow et al. .................... | 323/280 |
| 2007/0252564 | A1 | * | 11/2007 | De Nisi et al. ................ | 323/268 |

OTHER PUBLICATIONS

Current Mode Charge Pump: Topology, Modeling and Control, 2004 35th Annual IEEE Power Electronics Specialists Conference, Aachen, Germany, Gerhard Thiele and Erich Bayer, pp. 3812-3817.

* cited by examiner

Primary Examiner — Adolf Berhane
Assistant Examiner — Jeffrey Gblende
(74) Attorney, Agent, or Firm — John J. Patti; Wade J. Brady, III; Frederick J. Telecky, Jr

(57) ABSTRACT

An apparatus is provided. The apparatus comprises an error amplifier that amplifies the difference between a reference voltage and a feedback voltage, a first variable impedance circuit coupled to the error amplifier that receives a control voltage from the error amplifier, a charge pump coupled to the variable impedance that receives an input voltage from the variable impedance, and a Miller compensator coupled to the charge pump and to the first variable impedance circuit. The Miller compensator receives the output voltage and output current from the charge pump. It also outputs the feedback voltage, adjusts the control voltage, and has a zero-pole that is proportional to a power of the output current of the charge pump.

18 Claims, 2 Drawing Sheets

DYNAMIC COMPENSATION FOR A PRE-REGULATED CHARGE PUMP

TECHNICAL FIELD

The invention relates generally to a charge pump and, more particularly, to a pre-regulated charge pump.

BACKGROUND

Switched capacitor DC-DC converter circuits are an integral part of many circuits. One frequent concern in designing these converters, especially in high speed applications, is the frequency responses of the circuit and the Miller effect. Some examples of such prior art designs can be seen in U.S. Pat. No. 6,600,299 and Thiele et al., "Current Mode Charge Pump: Topology, Modeling and Control," 35*th Annual IEEE Power Electronics Specialists Conference*, pp. 3812-7, 2004.

SUMMARY

An embodiment of the present invention, accordingly, provides an apparatus. The apparatus comprises an error amplifier that amplifies the difference between a reference voltage and a feedback voltage; a first variable impedance circuit coupled to the error amplifier, wherein the variable impedance receives a control voltage from the error amplifier; a charge pump coupled to the variable impedance, wherein the charge pump receives an input voltage from the variable impedance circuit, and wherein the charge pump outputs an output voltage and an output current; and a Miller compensator coupled to the charge pump and to the first variable impedance circuit, wherein the Miller compensator receives the output voltage and output current, and wherein the Miller compensator outputs the feedback voltage, and wherein the Miller compensator adjusts the control voltage, and wherein the Miller compensator has a zero-pole that is proportional to a power of the output current.

In accordance with an embodiment of the present invention, the Miller compensator further comprises a voltage divider that receives the output voltage and generates the feedback voltage.

In accordance with an embodiment of the present invention, the Miller compensator further comprises a current mirror; and a second variable impedance circuit coupled to the current mirror, the charge pump, and the first variable impedance circuit, wherein the impedance of the second variable impedance circuit is controlled by the output current of the charge pump.

In accordance with an embodiment of the present invention, the second variable impedance circuit further comprises a first transistor that is coupled to the charge pump; a diode-connected transistor coupled to the charge pump, the first transistor, and the current mirror; and a capacitor coupled to the first transistor.

In accordance with an embodiment of the present invention, the first impedance circuit comprises a transistor, wherein the transistor is operated in a linear region.

In accordance with an embodiment of the present invention, the Miller compensator further comprises a FET coupled to the error amplifier at its gate, wherein the FET senses the current through the first impedance circuit.

In accordance with an embodiment of the present invention, the zero-pole is proportional to the square root of the output current.

In accordance with an embodiment of the present invention, an apparatus is provided. The apparatus comprises a supply voltage; an error amplifier that amplifies the difference between a reference voltage and a feedback voltage; a first FET coupled to supply voltage at its drain and coupled to the error amplifier at its gate, wherein the first FET receives a control voltage from the error amplifier; a charge pump coupled to the source of the first FET, wherein the charge pump receives an input voltage from the first FET, and wherein the charge pump outputs an output voltage and an output current; and a Miller compensator having a zero-pole that is proportional to a power of the output current. The Miller compensator includes a second FET coupled to the supply voltage at its drain and the error amplifier at its gate, wherein the second FET senses the current through the first FET; a current mirror coupled to the second FET; a variable impedance circuit coupled to the current mirror and coupled to the charge pump, wherein the impedance of the second variable impedance circuit is controlled by the output current of the charge pump.

In accordance with an embodiment of the present invention, the variable impedance circuit further comprises a third FET coupled to the charge pump at its source; a diode-connected FET with its source coupled to its gate, wherein the diode-connected FET is coupled at its drain to the charge pump; at its drain to the source of the third FET; at its gate and source to the gate of the third FET; and at its gate and source to the current mirror; and a capacitor coupled between the gate of the first FET and the drain of the third FET.

In accordance with an embodiment of the present invention, an apparatus is provided. The apparatus comprises a converter; an error amplifier coupled to and powered by the converter, wherein the error amplifier amplifies the difference between a reference voltage and a feedback voltage; a first variable impedance circuit coupled to the error amplifier and the converter, wherein the variable impedance circuit receives a control voltage from the error amplifier; a charge pump coupled to the variable impedance circuit and the converter, wherein the charge pump receives an input voltage from the variable impedance, and wherein the charge pump outputs an output voltage and an output current; and a Miller compensator coupled to the charge pump and to the first variable impedance circuit, wherein the Miller compensator receives the output voltage and output current, and wherein the Miller compensator outputs the feedback voltage, and wherein the Miller compensator adjusts the control voltage, and wherein the Miller compensator has a zero-pole that is proportional to the output voltage.

In accordance with an embodiment of the present invention, the converter is a DC-DC converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
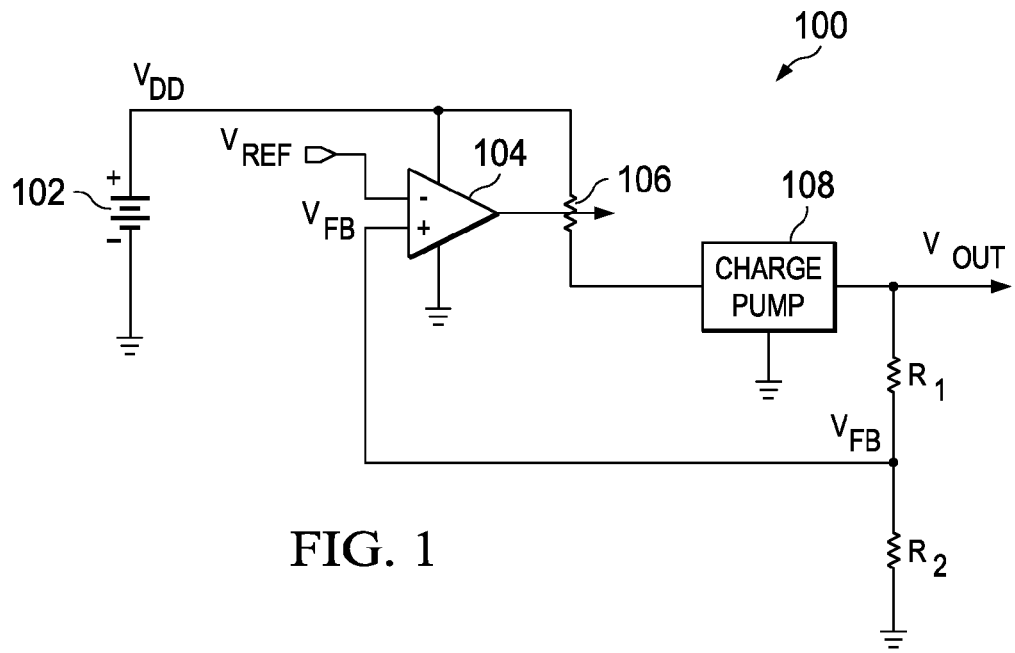
FIG. 1 is a block diagram of an example of a voltage mode pre-regulated charge pump circuit that demonstrates some principles and design considerations.

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally designates a voltage mode pre-regulated charge pump circuit. The circuit 100 demonstrates some principles and design considerations in designing a pre-regulated charge pump circuit, but it is not considered to be admitted prior art. Circuit 100 is generally comprised of a power supply 100, an error amplifier 104, a variable impedance circuit 106, a charge pump 108 and a voltage divider having resistors $R_1$ and $R_2$. Preferably, resistors $R_1$ and $R_2$ are equal to one another.

Circuit 100 includes a voltage mode feedback or control loop that allows for regulation to be independent of the topology of the charge pump 106. Instead, the charge pump 106 can be considered to operate as a generally continuous voltage multiplier. In operation, the feedback voltage $V_{FB}$ is matched to a reference voltage $V_{REF}$ by applying the voltages to error amplifier 104 so that the error amplifier 104 then controls the variable impedance 106. The variable impedance 106 then outputs a voltage and current to the charge pump 108, which output an output voltage $V_{OUT}$.

The control loop of circuit 100 has an open loop transfer function with the following form:

$$H(s) = \frac{A_0(1 - s/a_Z)}{(1 + s/\omega_1)(1 + s/\omega_2)} \quad (1)$$

The first pole $\omega_1$ is formed by the error amplifier 104 and its capacitive load. The second pole $\omega_2$ is generated by the first impedance circuit 106 device and the charge pump 108, which together form a gain stage. The transfer function zero $\omega_Z$ can be realized by using a nulling resistor in compensation.

From this transfer function of Equation (1), it can clearly be seen that the second pole $\omega_2$ is dependent on the capacitive load of the charge pump 108. The second pole $\omega_2$ would, therefore, be dependent on the output current $I_{OUT}$ of the charge pump as follows:

$$\omega_2 \propto \sqrt{I_{OUT}} \quad (2)$$

Thus, for low values of the output current $I_{OUT}$, the second pole $\omega_2$ would have a significant affect and may, in fact, become the dominant pole. So for the circuit 100 to generally remain stable, the first pole $\omega_1$ should be much less than the second pole $\omega_2$, restricting the bandwidth of the circuit 100.

Figure 2:
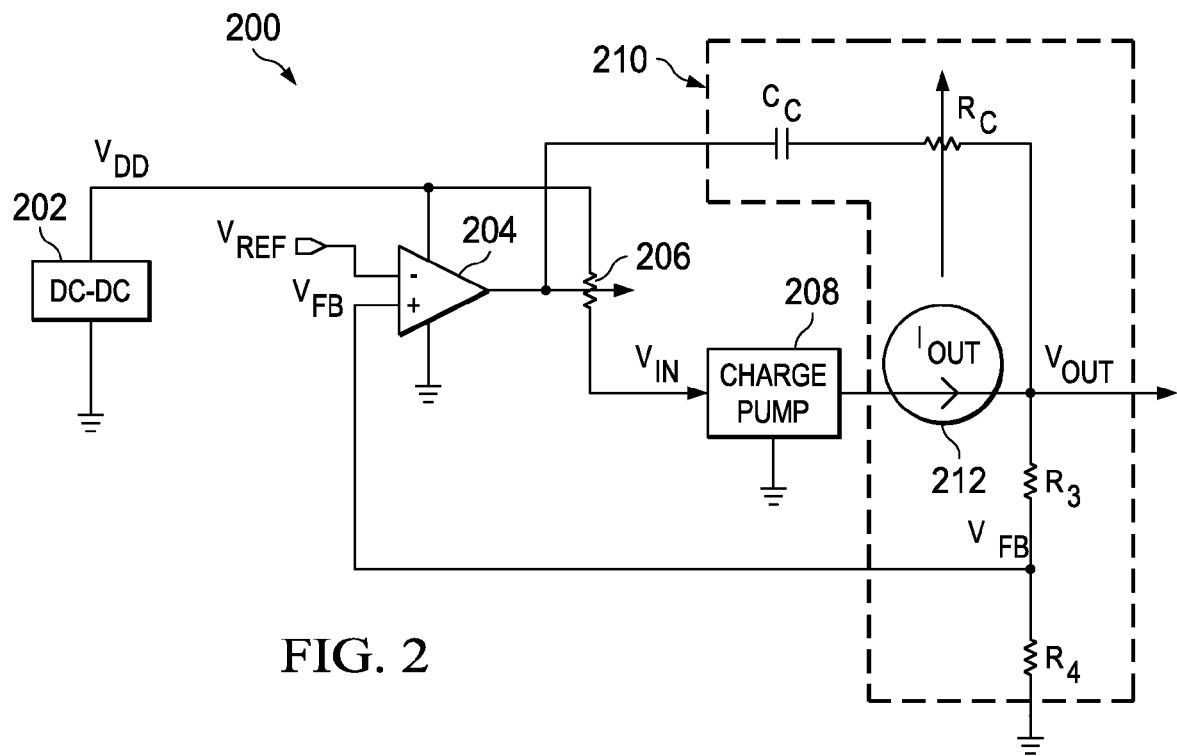
FIG. 2 is a block diagram of a dynamically compensated pre-regulated charge pump circuit in accordance with an embodiment of the present invention.
Figure 3:
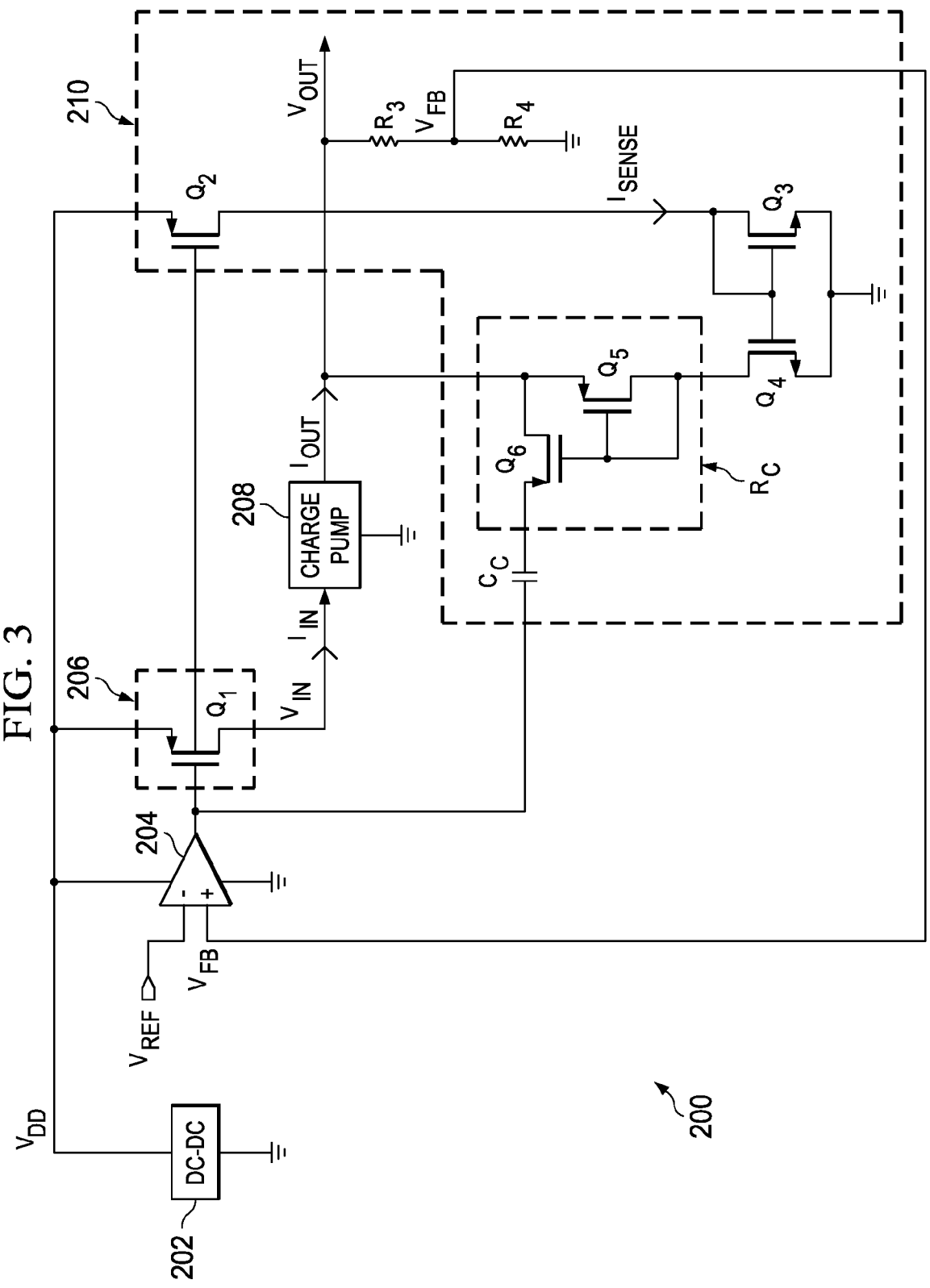
FIG. 3 is a more detailed block diagram of FIG. 2.

Taking into consideration the principles demonstrated by circuit 100, reference numeral 200 of FIGS. 2 and 3 generally depicts a dynamically compensated pre-regulated charge pump circuit in accordance with an embodiment of the present invention. Circuit 200 is designed in such a way that the zero-pole $\omega_Z$ is proportional to the square root of $I_{OUT}$, which would allow for an increased bandwidth compared to circuit 100. To assist in accomplishing this, circuit 200 is generally comprised of a power supply 202, an error amplifier 204, a variable impedance circuit 206, a charge pump 208, and a Miller compensator 210. As with circuit 100, the circuit 200 has feedback voltage $V_{FB}$ that is matched to a reference voltage $V_{REF}$ by applying the voltages to error amplifier 204 so that the error amplifier 204 then controls the variable impedance 206. The variable impedance 206 then outputs a voltage and current to the charge pump 208, which output an output voltage $V_{OUT}$.

However, one difference between the circuit 100 and circuit 200 is the use of the Miller compensator 210. The Miller compensator 210 generally comprises a current source 212, a second impedance circuit $R_C$ and $C_C$, and a voltage divider having resistor $R_3$ and $R_4$. Voltage divider having resistor $R_3$ and $R_4$ receives the output voltage and generates the feedback voltage $V_{FB}$, similar to circuit 100. The current source 212 adjusts resistor $R_C$ so that the combined impedance of the resistor $R_C$ and capacitor $C_C$ can provide an adjustment to the voltage control that is input into the impedance circuit 206, and would allow the zero-pole to be as follows:

$$\omega_Z \propto \frac{1}{R_C \cdot C_C}. \quad (3)$$

Now turning to FIG. 3, the details of the circuit 200 can be seen. First, the impedance circuit is generally comprised of a PMOS FET $Q_1$, which preferably operates in a linear region, and the resistor $R_C$ is generally comprised of diode-connected PMOS FETs $Q_5$ and PMOS FET $Q_6$ (which preferably operate in a linear region). Operating as the resistor $R_C$ is an PMOS FET $Q_2$, which preferably operates in a linear region. This PMOS FET $Q_2$ preferably receives the control voltage and is coupled to the gate of PMOS FET $Q_1$, while the drain of the PMOS FET $Q_2$ is coupled to the power supply 202 (preferably a DC-DC converter). Thus, the current flowing through the impedance circuit 102 can be sensed by the PMOS FET $Q_2$. This sensed current ISENSE is then fed to a current mirror $Q_3$ and $Q_4$ (preferably NMOS FETs), which is coupled to the resistor $R_C$. This arrangement allows the impedance across PMOS FET Q6 to be as follows, thus allowing the zero-pole to be proportional to the square root of the output current $I_{OUT}$:

$$R_{Q3} \propto \frac{1}{\sqrt{I_{OUT}}} \quad (4)$$

Alternatively, under the circumstances where charge pump 208 is inverting, the DC-DC conversion ratio is generally negative. To account for the different current direction, PMOS FETs $Q_3$ through $Q_6$ of circuit 200 could be replaced with NMOS FETs. Additionally, another current mirror (using PMOS FETs) would also be employed

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an error amplifier that amplifies the difference between a reference voltage and a feedback voltage;
   a first variable impedance circuit coupled to the error amplifier, wherein the variable impedance circuit receives a control voltage from the error amplifier;
   a charge pump coupled to the variable impedance, wherein the charge pump receives an input voltage from the variable impedance, and wherein the charge pump outputs an output voltage and an output current; and
   a Miller compensator coupled to the charge pump and to the first variable impedance circuit, wherein the Miller compensator receives the output voltage and output current, and wherein the Miller compensator outputs the feedback voltage, and wherein the Miller compensator adjusts the control voltage, and wherein the Miller compensator has a zero-pole that is proportional to a power of the output current, and wherein the Miller compensator includes:
      a current mirror; and
      a second variable impedance circuit coupled to the current mirror, the charge pump, and the first variable impedance circuit, wherein the impedance of the second variable impedance circuit is controlled by the output current of the charge pump.

2. The apparatus of claim 1, wherein the Miller compensator further comprises a voltage divider that receives the output voltage and generates the feedback voltage.

3. The apparatus of claim 1, wherein the second variable impedance circuit further comprises:
   a first transistor that is coupled to the charge pump;
   a diode-connected transistor coupled to the charge pump, the first transistor, and the current mirror; and
   a capacitor coupled to the first transistor.

4. The apparatus of claim 1, wherein the first impedance circuit comprises a transistor, wherein the transistor is operated in a linear region.

5. The apparatus of claim 1, wherein the Miller compensator further comprises a FET coupled to the error amplifier at its gate, wherein the FET senses the current through the first impedance circuit.

6. The apparatus of claim 1, wherein the zero-pole is proportional to the square root of the output current.

7. An apparatus comprising:
   a supply voltage;
   an error amplifier that amplifies the difference between a reference voltage and a feedback voltage;
   a first FET coupled to supply voltage at its drain and coupled to the error amplifier at its gate, wherein the first FET receives a control voltage from the error amplifier;
   a charge pump coupled at the source of the first FET, wherein the charge pump receives an input voltage from the first FET, and wherein the charge pump outputs an output voltage and an output current; and
   a Miller compensator having a zero-pole that is proportional to a power of the output current, wherein the Miller compensator includes:
      a second FET coupled to the supply voltage at its drain and the error amplifier at its gate, wherein the second FET senses the current through the first FET;
      a current mirror coupled to the second FET; and
      a variable impedance circuit coupled to the current mirror and coupled to the charge pump, wherein the impedance of the second variable impedance circuit is controlled by the output current of the charge pump.

8. The apparatus of claim 7, wherein the Miller compensator further comprises a voltage divider that receives the output voltage and generates the feedback voltage.

9. The apparatus of claim 7, wherein the variable impedance circuit further comprises:
   a third FET coupled to the charge pump at its source;
   a diode-connected FET with its source coupled to its gate, wherein the diode-connected FET is coupled:
      at its drain to the charge pump;
      at its drain to the source of the third FET; at its gate and source to the gate of the third FET; at its gate and source to the current mirror; and
      a capacitor coupled between the gate of the first FET and the drain of the third FET.

10. The apparatus of claim 7, wherein the first FET is operated in a linear region.

11. The apparatus of claim 7, wherein the zero-pole is proportional to the square root of the output current.

12. An apparatus comprising:
   a converter;
   an error amplifier coupled to and powered by the converter, wherein the error amplifier amplifies the difference between a reference voltage and a feedback voltage;
   a first variable impedance circuit coupled to the error amplifier and the converter, wherein the variable impedance circuit receives a control voltage from the error amplifier;
   a charge pump coupled to the variable impedance and the converter, wherein the charge pump receives an input voltage from the variable impedance, and wherein the charge pump outputs an output voltage and an output current; and
   a Miller compensator coupled to the charge pump and to the first variable impedance circuit, wherein the Miller compensator receives the output voltage and output current, and wherein the Miller compensator outputs the feedback voltage, and wherein the Miller compensator adjusts the control voltage, and wherein the Miller compensator has a zero-pole that is proportional to the output voltage, and wherein the Miller compensator includes:
      a current mirror; and
      a second variable impedance circuit coupled to the current mirror, the charge pump, and the first variable impedance circuit, wherein the impedance of the second variable impedance circuit is controlled by the output current of the charge pump.

13. The apparatus of claim 12, wherein the Miller compensator further comprises a voltage divider that receives the output voltage and generates the feedback voltage.

14. The apparatus of claim 12, wherein the second variable impedance circuit further comprises:
   a first transistor that is coupled to the charge pump;
   a diode-connected transistor coupled to the charge pump, the first transistor, and the current mirror; and
   a capacitor coupled to the first transistor.

15. The apparatus of claim 12, wherein the first impedance circuit comprises a transistor, wherein the transistor is operated in a linear region.

16. The apparatus of claim 12, wherein the Miller compensator further comprises a FET coupled to the error amplifier at its gate and to the converter at its drain, wherein the FET senses the current through the first impedance circuit.

17. The apparatus of claim 12, wherein the converter is a DC-DC converter.

18. The apparatus of claim 12, wherein the zero-pole is proportional to the square root of the output current.

* * * * *